Figure 1:
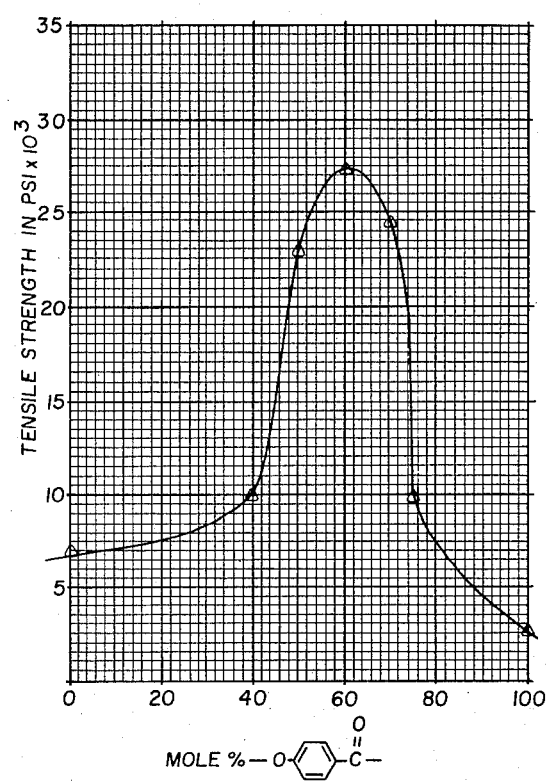

United States Patent [19] [11] 3,859,251
Kuhfuss et al. [45] Jan. 7, 1975

[54] POLY(ESTER-AMIDE)

[75] Inventors: Herbert F. Kuhfuss; Winston J. Jackson, Jr., both of Kingsport, Tenn.

[73] Assignee: Eastman Kodak Company, Rochester, N.Y.

[22] Filed: Oct. 19, 1973

[21] Appl. No.: 408,251

[52] U.S. Cl....... 260/47 CZ, 117/161 K, 260/2.5 N, 260/33.4 P, 260/33.8 R, 260/40 R
[51] Int. Cl............................................ C08g 17/02
[58] Field of Search................................ 260/47 CZ

[56] References Cited
UNITED STATES PATENTS

| 3,272,774 | 9/1966 | Moyer, Jr. et al. | 260/47 |
| 3,415,780 | 12/1968 | Holub | 260/47 |
| 3,440,218 | 4/1969 | Caldwell | 260/47 |
| 3,546,178 | 12/1970 | Caldwell et al. | 260/75 |
| 3,575,928 | 4/1971 | Lenz et al. | 260/47 |
| 3,598,864 | 8/1971 | Caldwell et al. | 260/47 |

Primary Examiner—Lester L. Lee

[57] ABSTRACT

Disclosed is a poly(ester-amide) comprised of the following divalent radicals:

(A)

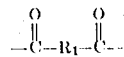

(B)

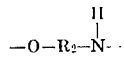

(C)

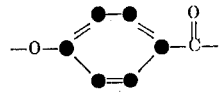

wherein $R_1$ and $R_2$ are particular types of organic radicals and the range of radical (C) is from 40 to 75 mole percent, based on the total moles of (A) and (C) combined. Molded articles of the poly(ester-amide) exhibit unobvious mechanical properties.

7 Claims, 1 Drawing Figure

POLY(ESTER-AMIDE)

This invention relates to a poly(ester-amide) exhibiting mechanical properties which are unobviously high over the mechanical properties that one would expect in view of the prior art.

The use of objects molded from synthetic polymers has expanded rapidly in the last several decades. In particular, certain synthetic polymers, including polyesters, polyamides and poly(ester-amides), have gained acceptance for molding objects that will be subjected to high strength service. These synthetic polymers have mechanical properties sufficiently high that in some cases objects molded of these polymers can be substituted for objects formed from much stronger materials, such as ceramic and metallic materials.

Although many poly(ester-amides) have mechanical properties that make the polymers suitable for molding into useful objects, most poly(ester-amides) are not suitable for high strength service since the mechanical properties of most poly(ester-amides) are not sufficiently high.

Applicants have now invented a poly(ester-amide) that exhibits mechanical properties sufficiently high to make the poly(ester-amide) suitable for various kinds of high strength service.

Very broadly the poly(ester-amide) of this invention is comprised of the following divalent radicals:

(A) $-\overset{O}{\overset{\|}{C}}-R_1-\overset{O}{\overset{\|}{C}}-$ (B) $-O-R_2-\overset{H}{\overset{|}{N}}-$ (C) 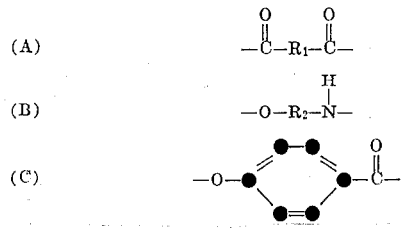

wherein $R_1$ and $R_2$ are particular types of organic radicals and the range of radical (C) is from 40 to 75 mole percent, based on the total moles of (A) and (C) combined. The prior art that applicants are aware of is U.S. Pat. No. 3,440,218. The poly(ester-amide) of this invention is thought to be patentable over the prior art because the poly(ester-amide) of this invention exhibits mechanical properties that are unobvious over the mechanical properties that one would expect of these poly(ester-amides) based on the prior art.

FIG. 1 presents a graph of one typical important mechanical property of both polymers of the prior art and the poly(ester-amide) of the invention described in Example 1.

Referring now to FIG. 1, it is to be observed that the tensile strength of the polymers of the prior art, wherein the amount of

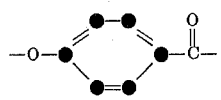

radical is 0 mole percent and 100 mole percent, is about 7,000 and about 2,500 psi., respectively. By way of contrast, it is to be observed that within the range of about 40 to about 75 mole percent of the

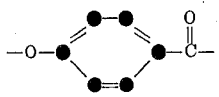

radical, the tensile strength of the poly(ester-amide) of the invention is unobviously high when compared to the tensile strength of the polymers of the prior art. Within this range the tensile strength of the poly(ester-amide) of the invention is at least a value in the order of about 10,000 psi. Within the range of about 50 to about 70 mole percent the tensile strength is a value in the order of at least about 23,000 psi. The maximum tensile strength occurs at about 60 mole percent and is a value in the order of about 27,000 psi.

Broadly, this invention can be described as a poly(ester-amide) having an inherent viscosity of at least 0.4, the poly(ester-amide) being comprised of the following divalent radicals:

(A) $-\overset{O}{\overset{\|}{C}}-R_1-\overset{O}{\overset{\|}{C}}-$ (B) $-O-R_2-\overset{H}{\overset{|}{N}}-$ (C) 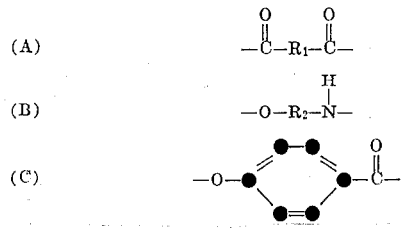

wherein
- $R_1$ is from 50 to 100 mole percent of a divalent aliphatic radical having from five to eight carbon atoms in a straight chain and from 50 to 0 mole percent of a divalent aromatic radical having from six to 16 carbon atoms with the carbonyl linkages separated by at least three carbon atoms.
- $R_2$ is from 60 to 100 mole percent para phenylene radical and from 40 to 0 mole percent of a divalent aromatic radical having six to 12 carbon atoms, and
- the range of radical (C) is from 40 to 75 mole percent based on the total moles of (A) and (C) combined.

In one particularly preferred embodiment the poly(ester-amide) has an inherent viscosity of at least 0.6, the poly(ester-amide) being comprised of the following divalent radicals:

(A) $-\overset{O}{\overset{\|}{C}}-(CH_2)_7-\overset{O}{\overset{\|}{C}}-$ (B) 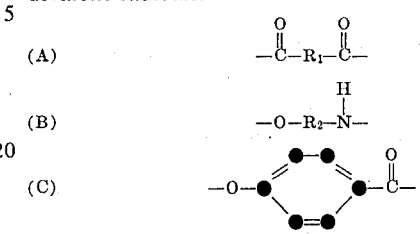

(C) 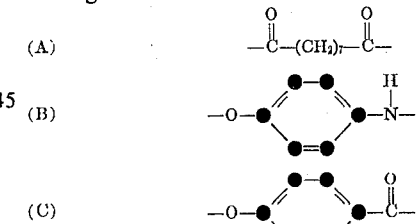

wherein the amount of radical (C) is about 60 mole percent, based on the total moles of (A) and (C) combined.

In another particular preferred embodiment the poly(ester-amide) has an inherent viscosity of at least 0.6, the poly(ester-amide) being comprised of the following divalent radicals:

(A) $-\overset{O}{\overset{\|}{C}}-R_1-\overset{O}{\overset{\|}{C}}-$ (B), (C) 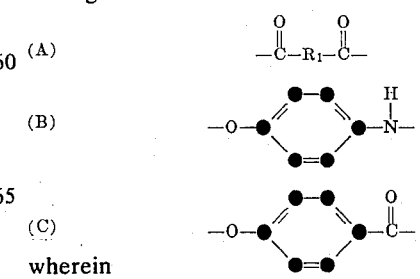

wherein $R_1$ is about 50 mole percent of a straight chain divalent aliphatic radical having seven carbon atoms and about 50 mole percent meta phenylene radical, and the amount of radical (C) is about 60 mole percent, based on the total moles of (A) and (C) combined.

In this embodiment the tensile strength is particularly high.

The poly(ester-amide) of this invention can be prepared by conventional polymerization processes, such as by acidolysis of p-acetoxyacetanilide with the dicarboxylic acid and p-acetoxybenzoic acid. A catalyst, such as dibutyl tin oxide, can be used in the preparation of these polymers, but high molecular-weight poly(ester-amides) can also be made without a catalyst. In a typical acidolysis process for preparing the poly(ester-amide) of this invention, the reactants are heated at about 230° C. until most of the monocarboxylic acid has evolved. The temperature of the melt is then increased to about 275° C., a vacuum of about 0.5 mm. is applied, and stirring is continued until a high melt viscosity polymer is obtained. At this stage, the inherent viscosity of the polyester is typically about 0.8–1.2. Other conventional processes for preparation of the poly(ester-amide) can be used.

As noted above, broadly the organic radical $R_1$ in the dicarboxylic acid residue designated as divalent radical (A) can be broadly described as from 50 to 100 mole percent of a divalent aliphatic radical having from five to eight carbon atoms in a straight chain and from 50 to 0 mole percent of a divalent aromatic radical having from six to 16 carbon atoms with the carbonyl linkages separated by at least three carbon atoms. In one embodiment the organic radical $R_1$ can be 100 mole percent of a divalent aliphatic radical having from five to eight carbon atoms in a straight chain. In a preferred aspect of this embodiment the organic radical $R_1$ can be a divalent straight chain aliphatic radical having five to eight carbon atoms. In a more preferred aspect of this embodiment the organic radical $R_1$ can be a divalent straight chain aliphatic radical having seven carbon atoms. In another embodiment the divalent aromatic radical of $R_1$ has six to 10 carbon atoms. In a preferred aspect of this embodiment organic radical $R_1$ can be from 50 to 80 mole percent of a divalent aliphatic radical having from five to eight carbon atoms in a straight chain and from 50 to 20 mole percent meta phenylene radical. In a more preferred aspect of this embodiment organic radical $R_1$ can be about 50 mole percent of a straight chain divalent aliphatic radical having seven carbon atoms and about 50 mole percent meta phenylene radical.

Examples of aliphatic dicarboxylic acids that can be used to contribute the divalent aliphatic radical to divalent radical (A) include pimelic, suberic, azelaic, or sebacic acid.

Example of aromatic dicarboxylic acids that can be used to contribute the divalent aromatic radical to divalent radical (A) include terephthalic; isophthalic; 4-methylisophthalic; t-butylisophthalic; 2,5-dichloroterephthalic; 1,4-naphthalic; diphenic; 4,4'-methylenedibenzoic; 2,5-naphthalenedicarboxylic; 2,6-naphthalenedicarboxylic; 2,7-naphthalenedicarboxylic; dibenzoic acid; bis(p-carboxyphenyl) methane; ethylene-bis-p-benzoic acid; and 1,5-naphthalene dicarboxylic acids. Other suitable aromatic dicarboxylic acids can be used.

As noted above, organic radical $R_2$ can broadly be from 60 to 100 mole percent para phenylene radical and from 40 to 0 mole percent of a divalent aromatic radical having six to 12 carbon atoms. In a preferred embodiment organic radical $R_2$ is 100 mole percent para phenylene radical.

Examples of reactants that can be used to contribute divalent radical (B) include p-aminophenol, m-aminophenol, 3-methyl-4-aminophenol, 2-chloro-4-aminophenol, 4-amino-1-naphthol, 4-amino-4'-hydroxydiphenyl, 4-amino-4'-hydroxydiphenyl ether, 4-amino-3'-hydroxydiphenylmethane, and 4-amino-4'-hydroxydiphenylsulfone. The diacyl derivatives of these materials that are useful as acidolysis reactants can be made by known methods employing lower acyl halides or anhydrides containing 2–8 carbon atoms. The acetyl derivatives are preferred but the propionyl, butyryl, or isobutyryl derivatives are examples of others which may also be used.

In this invention p-hydroxybenzoic acid can be used to contribute radical (C). If it is desired to form the poly(ester-amide) by acidolysis, acyloxy derivative of p-hydroxybenzoic acid can be prepared by esterification of the hydroxyl group with an acyl group containing from 2–8 carbon atoms. Examples of such acyloxy esters are the acetate, propionate, butyrate, and benzoate. The acyloxybenzoic acids can be prepared by conventional processes, such as reaction between p-hydroxybenzoic acid and a carboxylic anhydride, such as acetic anhydride. Other process for preparation of the acyloxy aromatic carboxylic acids are well known in the art. If desired, some meta hydroxybenzoic acid can be substituted for the para isomer, but the mechanical properties of the poly(ester-amide) are often reduced depending on the quantity of the meta isomer used.

In this invention the divalent aliphatic radical of divalent radical $R_1$ has been described as having carbon atoms "in a straight chain." By the term "in a straight chain" we mean that there must be five to eight carbon atoms in a straight chain between the carboxyl groups, even though this chain may contain other substituents. Thus, sebacic acid substituted with one or more alkyl groups is within the scope of this description.

In this invention the divalent aliphatic radical of divalent radical $R_1$ has also been described as being a divalent "straight chain" aliphatic radical. By the term "straight chain" we mean that the structure of the carbon atoms between the carboxyl groups is unbranched. Thus, a methyl substituted pimelic acid would be beyond the scope of this description.

The inherent viscosity of the poly(ester-amide) of this invention is at least 0.4, but can vary widely upward from 0.4. In one embodiment the inherent viscosity of the poly(ester-amide) is at least 0.6. The inherent viscosity of the copolyester can, if desired, be increased still further to have an inherent viscosity of 0.6, 0.7, 1.0, or even higher, using techniques well known in the art.

The inherent viscosity of the poly(ester-amide) of this invention is measured at 25° C. using 0.50 gram of polymer per 100 ml. of a solvent composed of 60 volumes of phenol and 40 volumes of tetrachloroethane.

The poly(ester-amide) of this invention is useful for preparing molded objects. Although the poly(ester-amide) of this invention can be injection molded at temperatures as low as 220° C., the best physical properties are obtained when the polymers are injection-molded at 260°–280° C. to attain increased orientation. As noted earlier, molded objects of the poly(ester-amide) of this invention exhibit mechanical properties which are unobvious over the prior art. As an example, molded bars of a poly(ester-amide) prepared from azelaic acid, p-acetoxyacetanilide and about 50–70 mole percent p-acetoxybenzoic acid have surprisingly high tensile strengths (22,000–27,700 psi.), whereas molded bars of conventional polyesters have tensile strengths of about 8,000–10,000 psi. As another example, poly(ester-amides) with even higher tensile strength are obtained when the acid portion of the polymer is modified with 50 mole percent of isophthalic acid. Molded bars of a poly(ester-amide) prepared from 20 mole percent azelaic acid, 20 mole percent isophthalic acid, 40 mole percent p-acetoxyacetanilide, and 60 mole percent p-acetoxybenzoic acid have a tensile strength of 34,800 psi, and flexural modulus of 10.9 × $10^5$ psi.

The poly(ester-amide) of this invention can be fabricated to give other types of shaped objects, such as foamed plastics, fibers, films, sheets, extruded shapes, and coatings.

The poly(ester-amide) of this invention can be used to prepare useful articles using conventional methods and conventional apparatus. For instance, the poly(ester-amide) can be formed into fibers by conventional melt spinning techniques and subsequently drafted, heatset and further processed according to techniques well known in the art. The poly(ester-amide) can be injection molded using conventional equipment and techniques.

The poly(ester-amide) of this invention also may contain nucleating agents, fillers, pigments, glass fibers, asbestos fibers, antioxidants, stabilizers, plasticizers, lubricants, fire-retardants, and other materials.

The following examples are presented to illustrate the process for preparing the poly(ester-amide) of the invention and the unobvious mechanical properties of the poly(ester-amide) of this invention.

The poly(ester-amides) are dried in an oven at 100° C. overnight and injection molded to give 2½ × ⅜ × 1/16-in. tensile bars and 5 × ½ × ⅛-in. flexure bars for testing. ASTM procedures are used for measuring the tensile strength and elongation (ASTM D1708), flexural modulus (ASTM D790), Izod import strength (ASTM D256 Method A), and heat-deflection temperature (ASTM D648).

EXAMPLE 1

This example illustrates the preparation of a poly(ester-amide) from azelaic acid, p-acetoxyacetanilide, and 60 mole percent of p-acetoxybenzoic acid.

A mixture of 15.0 g. (0.08 mole) azelaic acid, 15.4 g. (0.08 mole) p-acetoxyacetanilide, and 21.6 g. (0.12 mole) p-acetoxybenzoic acid is placed in a 250-ml. flask equipped with a stirrer, a short distillation column and an inlet for nitrogen. The flask is evacuated and purged three times with nitrogen before being lowered into a metal bath maintained at 180° C. The mixture is heated under a nitrogen atmosphere with stirring to a temperature of 240° C. at which point acetic acid begins to distill from the vessel. After the reaction mixture is heated with stirring at this temperature for 30 min., the temperature of the bath is increased to 270° C. A vacuum of 0.5 mm. of Hg is then applied over a period of 15 min. After stirring is continued under 0.5 mm. of Hg at 285° C. for 60 min., a high melt viscosity, opaque, light yellow polymer is obtained. The polymer has an inherent viscosity of 1.17.

Using the above process, a series of similar poly(ester-amides) is prepared from azelaic acid, p-acetoxyacetanilide, and 40–75 mole percent p-acetoxybenzoic acid and injection molded at 260° C. The following table lists the properties. Also included are the properties of a homopoly(ester-amide) prepared from azelaic acid and p-acetoxyacetanilide (first column in table), and (last column of table) the homopolyester of p-hydroxybenzoic acid (Ekonol, obtained from the Carborundum Company and described in Eng. Polym Sci. Technol. 1971, 15, 292–306). FIG. 1 presents a plot of the tensile strength data of the table. Note the high tensile strength of the compositions containing 50–70 mole percent p-hydroxybenzoic acid:

|  | p-Hydroxybenzoic Acid, Mole Percent | | | | | | |
|---|---|---|---|---|---|---|---|
|  | 0 | 40 | 50 | 60 | 70 | 75 | 100[a] |
| Inherent viscosity of molded bar | 0.67 | 0.55 | 0.87 | 1.1 | 1.02 | 0.91 | b |
| Tensile strength, psi. | 7,000 | 9,900 | 22,800 | 27,700 | 24,500 | 9,800 | 2,500 |
| Elongation, percent | 25 | 23 | 34 | 40 | 11 | 19 | 1 |
| Flexural modulus, $10^5$ psi. | 2.5 | 3.5 | 4.9 | 5.3 | 5.0 | 3.0 | 11 |
| Notched Izod impact strength, ft.-lb./in. of notch | 0.6 | 0.4 | 2.6 | 3.9 | 1.1 | 0.3 | <0.2 |
| Heat distortion temp. (264 psi.), °C. | 58 | 61 | 104 | 114 | 108 | 91 | >200 |

[a]Compression-molded Ekonol from Carborundum Company.
[b]Cannot be measured because of insolubility in the phenol/tetrachloroethane solvent used for determining inherent viscosities.

When the azelaic acid is replaced in part by an aromatic dicarboxylic acid disclosed to be useful in this invention, the mechanical properties, particularly the tensile strength, are often more desirable.

Similar results can be obtained when a portion of the p-acetoxyacetanilide is replaced by another suitable aromatic aminophenol.

Unlike most poly(ester-amides), the mechanical properties of the poly(ester-amide) of this invention can be in the some instances appreciably affected by small variations in molding conditions and physical dimensions of the bars used for testing. Although applicants are uncertain as to why the variation in molding conditions give different mechanical property values, the one theory of particular merit is that the degree of orientation affects the level of properties. Thus, pursuing this theory, thin bars generally would exhibit higher tensile strengths than thick bars.

EXAMPLE 2

This example illustrates the higher tensile strength obtained when the dicarboxylic acid is comprised of 50 mole percent of an aliphatic acid portion and 50 mole percent of an aromatic acid portion.

The procedure described in Example 1 is used to prepare a poly(ester-amide) from 20 mole percent azelaic acid, 20 mole percent isophthalic acid, 40 mole percent p-acetoxyacetanilide, and 60 mole percent p-acetoxybenzoic acid. The polymer has an inherent viscosity of 1.01. Injection-molded bars have the following properties: tensile strength 34,800 psi., elongation 26%, flexural modulus $10.9 \times 10^5$ psi., notched Izod impact strength 5.2 ft.-lb./in. of notch, and heat-distortion temperature 114° C.

EXAMPLE 3

Using the procedure described in Example 1, a polymer is prepared from 64.0 g. (0.4 mole) of pimelic acid, 77.2 g. (0.4 mole) p-acetoxyacetanilide, and 108 g. (0.6 mole) p-acetoxybenzoic acid. The tough, light yellow, opaque polymer has an inherent viscosity of 0.78 The tensile strength of injection-molded bars is 17,800 psi.

EXAMPLE 4

The procedure of Example 1 is used to prepare a copolymer with 0.6 mole (60 mole percent) p-acetoxybenzoic acid, 0.4 mole of suberic acid and 0.4 mole percent of p-acetoxyacetanilide. The polymer has an inherent viscosity of 1.14.

Injection-molded bars have the following properties: tensile strength 22,000 psi., elongation 29%, flexural modulus $4.6 \times 10^5$ psi. and heat-distortion temperature (264 psi. load) 144° C.

EXAMPLE 5

The procedure described in Example 1 is used to prepare a poly(ester-amide) from 20 mole percent sebacic acid, 20 mole percent isophthalic acid, 40 mole percent p-acetoxyacetanilide and 60 mole percent p-acetoxybenzoic acid. A tough, fibrous polymer with an inherent viscosity of 1.05 is obtained. Molded bars have a tensile strength of 14,300 psi. and flexural modulus of $9.6 \times 10^5$ psi.

EXAMPLE 6

The procedure described in Example 1 is used to prepare a poly(ester-amide) from 30 mole percent azelaic acid, 10 mole percent sebacic acid, 40 mole percent p-acetoxyacetanilide, and 60 mole percent p-acetoxybenzoic acid. The polymer has an inherent viscosity of 1.05. Injection-molded bars have the following properties: tensile strength 25,000 psi., elongation 24%, and flexural modulus $4.5 \times 10^5$ psi.

Althouth the invention has been described in considerable detail with particular reference to certain preferred embodiments thereof, variations and modifications can be effected within the spirit and scope of the invention.

We claim:

1. A poly(ester-amide) having an inherent viscosity of at least 0.4 measured at 25° C. using 0.50 gram of polymer per 100 ml. of a solvent composed of 60 volumes of phenol and 40 volumes of tetrachloroethane, the poly(ester-amide) consisting essentially of the following divalent radicals:

(A) 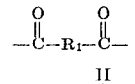

(B) 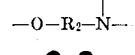

(C) 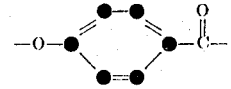

wherein
$R_1$ is from 50 to 100 mole percent of a divalent aliphatic radical having from five to eight carbon atoms in a straight chain and from 50 to 0 mole percent of a divalent aromatic radical having from six to 16 carbon atoms with the carbonyl linkages separated by at least three carbon atoms,
$R_2$ is from 60 to 100 mole percent para phenylene radical and from 40 to 0 mole percent of a divalent aromatic radical having six to 12 carbon atoms, and
the range of radical (C) is from 40 to 75 mole percent based on the total moles of (A) and (C) combined.

2. The poly(ester-amide) of claim 1 wherein
$R_1$ is 100 mole percent of a divalent aliphatic radical having from five to eight carbon atoms in a straight chain,
$R_2$ is 100 mole percent para phenylene radical, and
the range of radical (C) is from 50 to 70 mole percent.

3. The poly(ester-amide) of claim 2 wherein $R_1$ is a divalent straight chain aliphatic radical having five to eight carbon atoms.

4. A poly(ester-amide) having an inherent viscosity of at least 0.6 measured at 25° C. using 0.50 gram of polymer per 100 ml. of a solvent composed of 60 volumes of phenol and 40 volumes of tetrachloroethane, the poly(ester-amide) consisting essentially of the following divalent radicals:

(A) 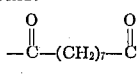

(B) 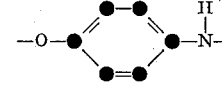

(C) 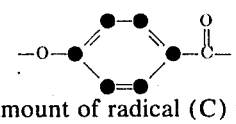

wherein the amount of radical (C) is about 60 mole percent, based on the total moles of (A) and (C) combined.

5. The poly(ester-amide) of claim 1 wherein the divalent aromatic radical of $R_1$ has six to 10 carbon atoms.

6. The poly(ester-amide) of claim 5 wherein
$R_1$ is from 50 to 80 mole percent of a divalent aliphatic radical having from five to eight carbon atoms in a straight chain and from 50 to 20 mole percent meta phenylene radical,
$R_2$ is 100 mole percent para phenylene radical, and
the range of radical (C) is from 50 to 70 mole percent.

7. A poly(ester-amide) having an inherent viscosity of at least 0.6 measured at 25° C. using 0.50 gram of polymer per 100 ml. of a solvent composed of 60 volumes of phenol and 40 volumes of tetrachloroethane, the poly(ester-amide) consisting essentially of the following divalent radicals:
(A) 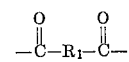
(B) 
(C) 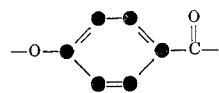
wherein
R₁ is about 50 mole percent of a straight chain divalent aliphatic radical having seven carbon atoms and about 50 mole percent meta phenylene radical, and
the amount of radical (C) is about 60 mole percent, based on the total moles of (A) and (C) combined.
* * * * *